(12) United States Patent
Lim et al.

(10) Patent No.: US 12,398,783 B1
(45) Date of Patent: *Aug. 26, 2025

(54) DRIVING DEVICE FOR VEHICLE

(71) Applicants: HYUNDAI MOTOR COMPANY, Seoul (KR); KIA CORPORATION, Seoul (KR)

(72) Inventors: Woo Hyun Lim, Hwaseong-si (KR); Dae In Lee, Gyeonggi-do (KR); Ki Seok Kim, Gyeonggi-do (KR); Kyoung Chul Min, Gyeonggi-do (KR); Jong Sool Park, Gyeonggi-do (KR); Kyung Won Suh, Gyeonggi-do (KR); Yeo Hae Lee, Gyeonggi-do (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/938,798

(22) Filed: Nov. 6, 2024

(30) Foreign Application Priority Data

Jul. 1, 2024 (KR) ........................ 10-2024-0086244

(51) Int. Cl.
*F16H 1/28* (2006.01)
*F16H 57/029* (2012.01)
*F16H 57/02* (2012.01)

(52) U.S. Cl.
CPC ......... *F16H 1/2827* (2013.01); *F16H 57/029* (2013.01); *F16H 1/2836* (2013.01); *F16H 1/2845* (2013.01); *F16H 2057/02043* (2013.01)

(58) Field of Classification Search
CPC .... F16H 1/2827; F16H 57/029; F16H 1/2836; F16H 1/2845; F16H 2057/02043
See application file for complete search history.

(56) References Cited

U.S. PATENT DOCUMENTS

| 2,144,964 | A | * | 1/1939 | De Falco | ................ F16H 1/006 74/411 |
| 3,315,547 | A | * | 4/1967 | Fritsch | .................. F16H 1/2836 475/346 |

(Continued)

FOREIGN PATENT DOCUMENTS

| DE | 3708149 C1 | * | 9/1988 | |
| DE | 102008001791 B4 | * | 9/2011 | ........... B60K 17/046 |
| DE | 102020106536 A1 | * | 9/2021 | |

*Primary Examiner* — Justin Holmes
(74) *Attorney, Agent, or Firm* — MCDONNELL BOEHNEN HULBERT & BERGHOFF LLP

(57) ABSTRACT

The present disclosure includes a ring gear, a final gear meshed with the ring gear, a carrier rotatably supporting the final gear, a sun gear having a rotation axis parallel to the rotation axis of the ring gear and installed to have a variable inter-axis distance, the sun gear being configured to receive power from outside, a link mechanism interconnecting the sun gear and the final gear so a connection angle changes depending on a change in the inter-axis distance between the sun gear and the ring gear, a gear train provided in the link mechanism to continuously establish a power transmission state between the sun gear and the ring gear regardless of the change in the inter-axis distance between the sun gear and the ring gear, and a carrier housing integrally coupled to the carrier and encasing the sun gear, the carrier, the ring gear, and the link mechanism.

13 Claims, 7 Drawing Sheets

(56) References Cited

U.S. PATENT DOCUMENTS

| | | | | |
|---|---|---|---|---|
| 5,360,380 | A * | 11/1994 | Nottle | F16H 3/76 |
| | | | | 475/182 |
| 11,639,101 | B1 * | 5/2023 | Park | F16H 1/26 |
| | | | | 475/346 |
| 12,122,230 | B2 * | 10/2024 | Park | F16H 1/2818 |
| 12,139,010 | B2 * | 11/2024 | Park | F16H 57/082 |
| 12,140,206 | B1 * | 11/2024 | Park | B60K 7/0007 |
| 12,203,536 | B1 * | 1/2025 | Lim | F16H 57/0025 |

* cited by examiner

DRIVING DEVICE FOR VEHICLE

CROSS-REFERENCE TO RELATED APPLICATION(S)

This application is based on and claims priority under 35 U.S.C. 119 to Korean Patent Application No. 10-2024-0086244, filed on Jul. 1, 2024, in the Korean Intellectual Property Office, the disclosure of which is herein incorporated by reference in its entirety.

TECHNICAL FIELD

The present disclosure relates to a device that transmits the driving force of a vehicle to a road surface.

BACKGROUND

A vehicle is configured to transmit power generated from a power source to wheels, thereby exerting the driving force of the vehicle.

The wheels of the vehicle are rotatably supported by knuckles, and the knuckles are supported by a suspension system to the vehicle body, thereby maintaining continuously stable contact with the ground while allowing for the absorption of relative displacements between the vehicle body and the wheels according to the driving of the vehicle, which ensures the ride comfort and driving performance of the vehicle.

Meanwhile, the driving device for the vehicle transmits power from the rotational power source, such as an engine or motor, to the wheels to drive the vehicle.

Recently, in-wheel motor driving devices in which the motors are directly installed on the driving wheels, have been proposed, but are not widely used due to issues such as motor durability and ride comfort problems arising from increased unsprung mass.

The foregoing described as the background art is intended merely to aid in the understanding of the background of the present disclosure, and is not intended to mean that the present disclosure falls within the purview of the related art already known to those skilled in the art.

SUMMARY

The present disclosure is to provide a driving device of a vehicle that receives power from a rotational power source such as a motor and outputs a gear-shifted rotational force, in which the input power can appropriately gear down to achieve excellent hill-climbing and acceleration performance, since the power source such as a motor can be separated from the wheels that are subjected to severe shocks and vibrations, the durability of the power source can be enhanced, superior ride comfort can be improved by reducing the unsprung mass of the vehicle compared to in-wheel motor drive systems, and continuous power transmission from the power source can be achieved in response to the movement of the wheels without using constant velocity joints, thereby reducing the space between the power source and the wheels and ultimately improving space utilization between the left and right wheels.

In view of the foregoing, a driving device for a vehicle includes a ring gear, a final gear meshed with the ring gear, a carrier rotatably supporting the final gear, a sun gear having a rotation axis parallel to the rotation axis of the ring gear and installed to have a variable inter-axis distance from the rotation axis of the ring gear, the sun gear being configured to receive power from outside, a link mechanism interconnecting the sun gear and the final gear such that a connection angle changes depending on a change in the inter-axis distance between the sun gear and the ring gear, a gear train provided in the link mechanism to continuously establish a power transmission state between the sun gear and the ring gear regardless of the change in the inter-axis distance between the sun gear and the ring gear, and a carrier housing integrally coupled to the carrier and encasing the sun gear, the carrier, the ring gear, and the link mechanism.

The ring gear may be installed to output power by passing through the carrier housing to the exterior, and an input shaft that transmits external power to the sun gear may connected by passing through the carrier housing from the exterior to the interior.

A ring gear boss penetrating the carrier housing 1 installed at a rotation center of the ring gear, and a wheel hub rotatably supported by the carrier housing may be coupled to the ring gear boss.

The carrier housing may include an outer housing part coupled to the wheel hub, and an inner housing part coupled with the outer housing part to form an accommodation space encasing the sun gear, the carrier, the ring gear, and the link mechanism, and having a housing opening through which the input shaft passes.

The housing opening of the inner housing part may be provided with a sealing member that closes the housing opening to block the accommodation space from the outside while absorbing a change in position of the input shaft.

A seal ring may be provided between the outer housing part and the ring gear boss, and the wheel hub may be coupled to the ring gear boss with a spline, and rotatably supported on the outer housing part via a wheel bearing.

The housing opening of the inner housing part may be configured such that the width in the up-and-down direction is longer than the width in the front-and-rear direction.

The carrier may include an outer carrier part, an inner carrier part disposed in parallel to and spaced internally from the outer carrier part with the final gear and link mechanism interposed therebetween, a bridge part interconnecting the inner carrier part and the outer carrier part, and a pinion shaft having opposite ends supported by the outer carrier part and the inner carrier part to rotatably support the final gear and the link mechanism.

The carrier may rotatably support multiple balance gears meshed with the ring gear to support the ring gear.

Along the outer periphery of the outer carrier part and the inner carrier part, multiple bridge parts may be provided to be spaced apart from the final gear and balance gears meshed with the ring gear.

The inner housing part of the carrier housing may be fixed to the inner carrier part of the carrier. The link mechanism may include a first link and a second link that are connected to be relatively rotatable, a joint gear may be installed on a rotation shaft that supports the first link and the second link to be relatively rotatable, and the gear train may include the joint gear, the final gear, a first intermediate gear interconnecting the sun gear and the joint gear, and a second intermediate gear interconnecting the joint gear and the final gear.

The sun gear, the joint gear, and the final gear may be all configured to have the same number of teeth.

Multiple link mechanisms may be arranged around the sun gear, and the multiple final gears constituting the link mechanisms may be arranged on the carrier at regular intervals along a circumferential direction.

The sun gear, the ring gear, and gear train may be configured with double helical gears.

According to the present disclosure, it is possible to provide a driving device of a vehicle that receives power from a rotational power source such as a motor and outputs a gear-shifted rotational force, in which the input power can appropriately gear down to achieve improved hill-climbing and acceleration performance, since the power source such as a motor can be separated from the wheels that are subjected to severe shocks and vibrations, the durability of the power source can be enhanced, superior ride comfort can be ensured by reducing the unsprung mass of the vehicle compared to in-wheel motor drive systems, and continuous power transmission from the power source can be achieved in response to the movement of the wheels without using constant velocity joints, thereby reducing the space between the power source and the wheels and ultimately improving space utilization between the left and right wheels.

In particular, according to the present disclosure, the ring gear and wheel can be supported on the carrier in a robust and stable manner, thereby enabling smooth and seamless vehicle driving and enhancing the durability of the driving device.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
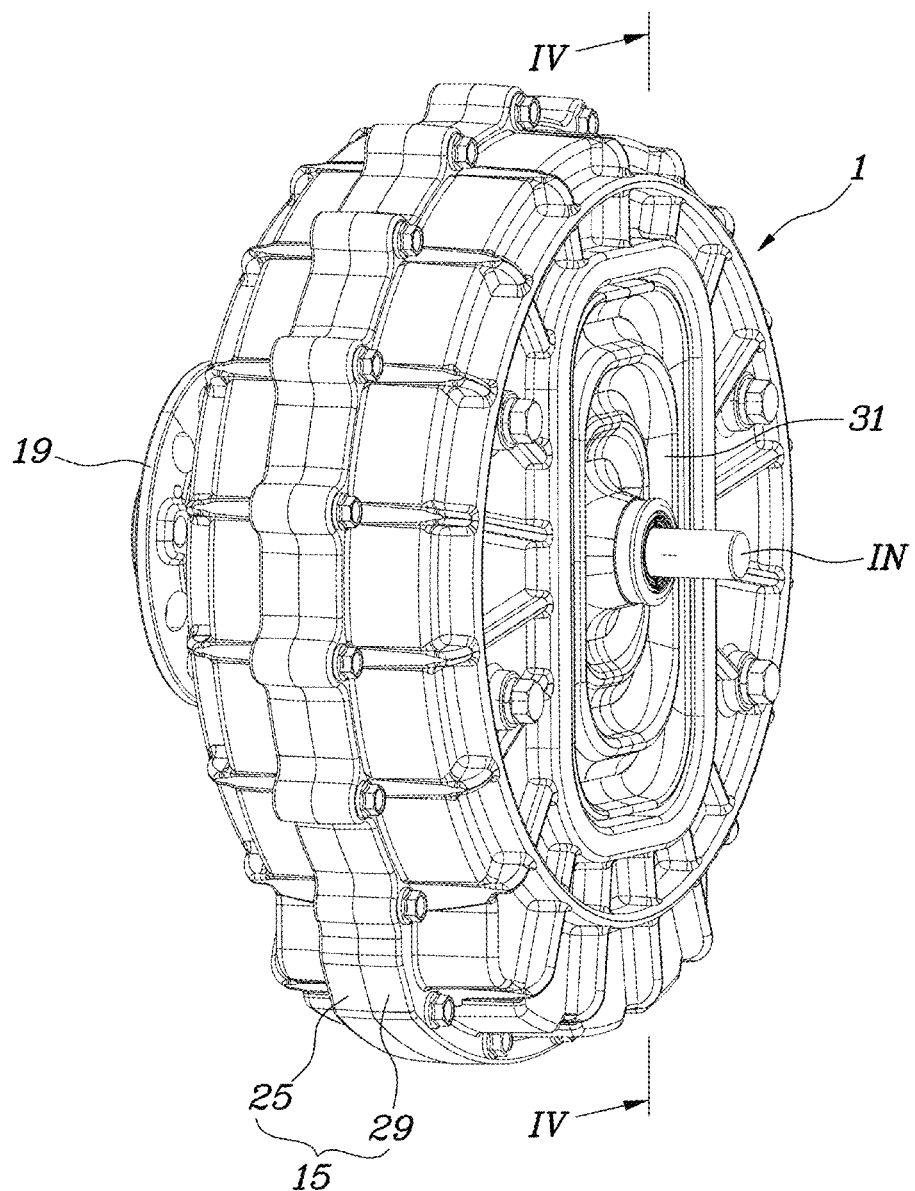
FIG. 1 is a view illustrating a driving device for a vehicle according to the present disclosure.

Hereinafter, embodiments set forth herein will be described in detail with reference to the accompanying drawings, and the same or similar elements are given the same and similar reference numerals regardless of figure numbers, so duplicate descriptions thereof will be omitted.

The terms "module" and "unit" used for the elements in the following description are given or interchangeably used in consideration of only the ease of writing the specification, and do not have distinct meanings or roles by themselves.

In describing the embodiments set forth herein, a detailed description of known functions or configurations incorporated herein will be omitted when it is determined that the description may make the subject matter of the embodiments set forth herein unclear. In addition, it should be appreciated that the accompanying drawings are provided only for the sake of easy understanding of the embodiments set forth herein, and the technical idea of the present disclosure is not limited to the accompanying drawings and includes all modifications, equivalents, or alternatives falling within the spirit and scope of the present disclosure.

Terms including an ordinal number such as "a first" and "a second" may be used to describe various elements, but the elements are not limited to the terms. The above terms are used merely for the purpose of distinguishing one element from other elements.

In the case where an element is referred to as being "connected" or "coupled" to any other elements, it should be understood that not only the element may be directly connected or coupled to the other elements, but also another element may exist therebetween. Contrarily, in the case where an element is referred to as being "directly connected" or "directly coupled" to any other element, it should be understood that no other element exists therebetween.

A singular expression may include a plural expression unless they are definitely different in a context.

As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Referring to FIGS. 1 to 7, an embodiment of a driving device 1 for a vehicle according to the present disclosure includes a ring gear 3, a final gear 5 meshed with the ring gear 3, a carrier 7 that rotatably supports the final gear 5, a sun gear 9 that has a rotation axis parallel to the rotation axis of the ring gear 3 and is installed so that the inter-axis distance from the rotation axis of the ring gear 3 is changeable, in which the ring gear is configured to receive power from the outside, a link mechanism 11 that interconnects the sun gear 9 and the final gear 5 so as to allow a connection angle to change depending on the change in the inter-axis distance between the sun gear 9 and the ring gear 3, a gear train 13 provided in the link mechanism 11 to continuously form a power transmission state between the sun gear 9 and the ring gear 3 regardless of the change in the inter-axis distance between the sun gear 9 and the ring gear 3, and a carrier housing 15 that is integrally coupled to the carrier 7 and encases the sun gear 9, the carrier 7, the ring gear 3, and the link mechanism 11.

That is, the carrier housing 15 and the carrier 7 serves to rotatably support the ring gear 3 without rotating, the ring gear 3 is rotated by a rotational force transmitted from the sun gear 9 via the gear train 13, and the link mechanism 11 is configured to absorb the change in the inter-axis distance between the sun gear 9 and the ring gear 3.

The ring gear 3 is installed to output power by passing through the carrier housing 15 to the exterior, and an input shaft IN that transmits external power to the sun gear 9 is connected by passing through the carrier housing 15 from the exterior to the interior.

That is, a ring gear boss 17 penetrating the carrier housing 15 is installed at the rotation center of the ring gear 3, and a wheel hub 19 rotatably supported on the carrier housing 15 is coupled to the ring gear boss 17.

A wheel W is mounted on the wheel hub 19, and the carrier housing 15 is supported to a vehicle body BD via a suspension system including a spring 21 and a damper 23 and is configured such that power can be supplied to the sun gear 9 from a power source such as a motor M installed on the vehicle body BD via the input shaft IN.

That is, the driving device 1 of the present disclosure has a state in which the carrier housing 15 and the carrier 7 are supported by the suspension system with respect to the vehicle body BD to be capable of being raised and lowered relative to the vehicle body BD, and is configured such that the sun gear 9 receives power via the input shaft IN, which is then reduced and transmitted to the ring gear 3 via the gear train 13, and the rotational force of the ring gear 3 is transmitted to the wheel W via the wheel hub 19.

Therefore, the driving device 1 of the present disclosure allows for the power source, such as the motor M, to be installed separately from the wheel W, which is subjected to severe shocks and vibrations. As a result, the durability of the power source can be improved, and superior ride comfort can be ensured by reducing the unsprung mass compared to in-wheel motor driving devices.

The carrier housing 15 includes an outer housing part 25 coupled to the wheel hub 19, and an inner housing part 29 coupled to the outer housing part 25 to form an accommodation space S encasing the sun gear 9, the carrier 7, the ring gear 3, and the link mechanism 11, and having a housing opening 27 through which the input shaft IN passes.

Therefore, the sun gear 9, the carrier 7, the ring gear 3, and the link mechanism 11 may be easily assembled in the state of being accommodated in the carrier housing 15.

The housing opening 27 of the inner housing part 29 is provided with a sealing member 31 that closes the housing opening 27 to block the accommodation space S from the outside while absorbing a change in the position of the input shaft IN.

The sealing member 31 may be configured in the form of a bellows made of rubber, and is configured to allow relative motion between the input shaft IN and the carrier housing 15 while closing the housing opening 27 to block the accommodation space S from the outside.

A seal ring 33 is provided between the outer housing part 25 and the ring gear boss 17 to prevent the oil lubricating the inside of the receiving space S from leaking to the outside.

The wheel hub 19 is coupled to the ring gear boss 17 with a spline, and is rotatably supported on the outer housing part 25 via a wheel bearing 35.

Accordingly, as the ring gear boss 17 is rotatably supported by the final gear 5 while being rotatably supported to the carrier housing 15 via the wheel hub 19 and the wheel bearing 35, the ring gear 3 can be rotated while being supported in a stable and robust state relative to the carrier 7 and the carrier housing 15.

Meanwhile, it is preferable to configure the housing opening 27 of the inner housing part 29 such that the width in the up-and-down direction is longer than the width in the front-and-back direction, so that the suspension system of the vehicle can adequately allow for vertical movement of the ring gear 3, the carrier 7, and the carrier housing 15 relative to the sun gear 9.

For reference, the front-to-back direction here refers to the front-to-back direction with reference to the vehicle body BD.

The carrier 7 includes an outer carrier part 37, an inner carrier part 39 disposed in parallel to and spaced internally from the outer carrier part 37 with the final gear 5 and link mechanism 11 interposed therebetween, a bridge part 41 interconnecting the inner carrier part 39 and the outer carrier part 37, and a pinion shaft 43 having opposite ends supported by the outer carrier part 37 and the inner carrier part 39 to rotatably support the final gear 5 and the link mechanism 11.

In addition, the inner housing part 29 of the carrier housing 15 is fixed to the inner carrier part 39 of the carrier 7.

That is, in the present embodiment, the inner housing part 29 is fixed to the inner carrier part 39 by several fastening bolts 45 that penetrate the inner housing part 29 and are fastened to the inner carrier part 39, thereby integrating the carrier housing 15 with the carrier 7.

The carrier 7 rotatably supports multiple balance gears 47 meshed with the ring gear 3 to support the ring gear 3, and along the outer periphery of the outer carrier part 37 and the inner carrier part 39, multiple bridge parts 41 are provided to be spaced apart from the final gear 5 and the balance gears 47 meshed with the ring gear 3, thereby allowing for meshing between the final gear 5 and the ring gear 3 as well as between the balance gears 47 and the ring gear 3, while ensuring that the carrier 7 maintains robust rigidity.

The link mechanism 11 includes a first link 49 and a second link 51 that are connected to be relatively rotatable, a joint gear 53 is installed on a rotation shaft that supports the first link 49 and the second link 51 to be relatively rotatable, and the gear train 13 includes the joint gear 53, the final gear 5, a first intermediate gear 55 interconnecting the sun gear 9 and the joint gear 53, and a second intermediate gear 57 interconnecting the joint gear 53 and the final gear 5.

Here, the sun gear 9, the joint gear 53, and the final gear 5 are all configured to have the same number of teeth.

When the sun gear 9, the joint gear 53, and the final gear 5 have the same number of teeth as described above, regarding the relative motion of the rotation axes of the sun gear 9 and the ring gear 3, the relative phase between the sun gear 9 and the ring gear 3 is maintained constant.

Here, regarding the relative motion of the sun gear 9 and the ring gear 3, the fact that the relative phase thereof is maintained constant means that, if the sun gear 9 does not turn around on its own axis, the ring gear 3 will also not rotate, even if there is vertical or lateral movement of the ring gear 3 relative to the sun gear 9.

Therefore, the power transmitted from the sun gear 9 is delivered to the ring gear 3 at a constant speed, regardless of a change in the inter-axis distance between the sun gear 9 and the ring gear 3. As a result, when the power generated by the motor M is transmitted from the sun gear 9 to the wheel W via the ring gear 3, even if the ring gear 3 and the wheel W move vertically or horizontally relative to the rotational axis of the motor M or the sun gear 9, the phase of the motor M connected to the sun gear 9 and the phase of the wheel connected to the ring gear 3 remain unchanged. Therefore, the driving force of the vehicle can be controlled stably via the motor M so that stable driving of the vehicle can be achieved.

If the conditions mentioned above are not met, and the number of teeth differs for any of the sun gear 9, the joint gear 53, and the final gear 5, even if the motor M rotates at a constant speed, the ring gear 3 and the wheel W may move relative to the sun gear 9 and the motor M, causing a phase difference between the sun gear 9 and the ring gear 3 and resulting in relative rotation, which may lead to vibrations in the vehicle depending on the driving direction of the vehicle.

Multiple link mechanisms 11 may be arranged around the sun gear 9, and the multiple final gears 5 constituting the link mechanisms 11 may be arranged on the carrier 7 at regular intervals along the circumferential direction.

Accordingly, by using the multiple final gears 5, the ring gear 3 can have a more stable rotational support state, and the power transmitted from the sun gear 9 to the ring gear 3 can be distributed and transmitted, so that the durability of each gear constituting the gear train 13 can be further improved.

Figure 2:
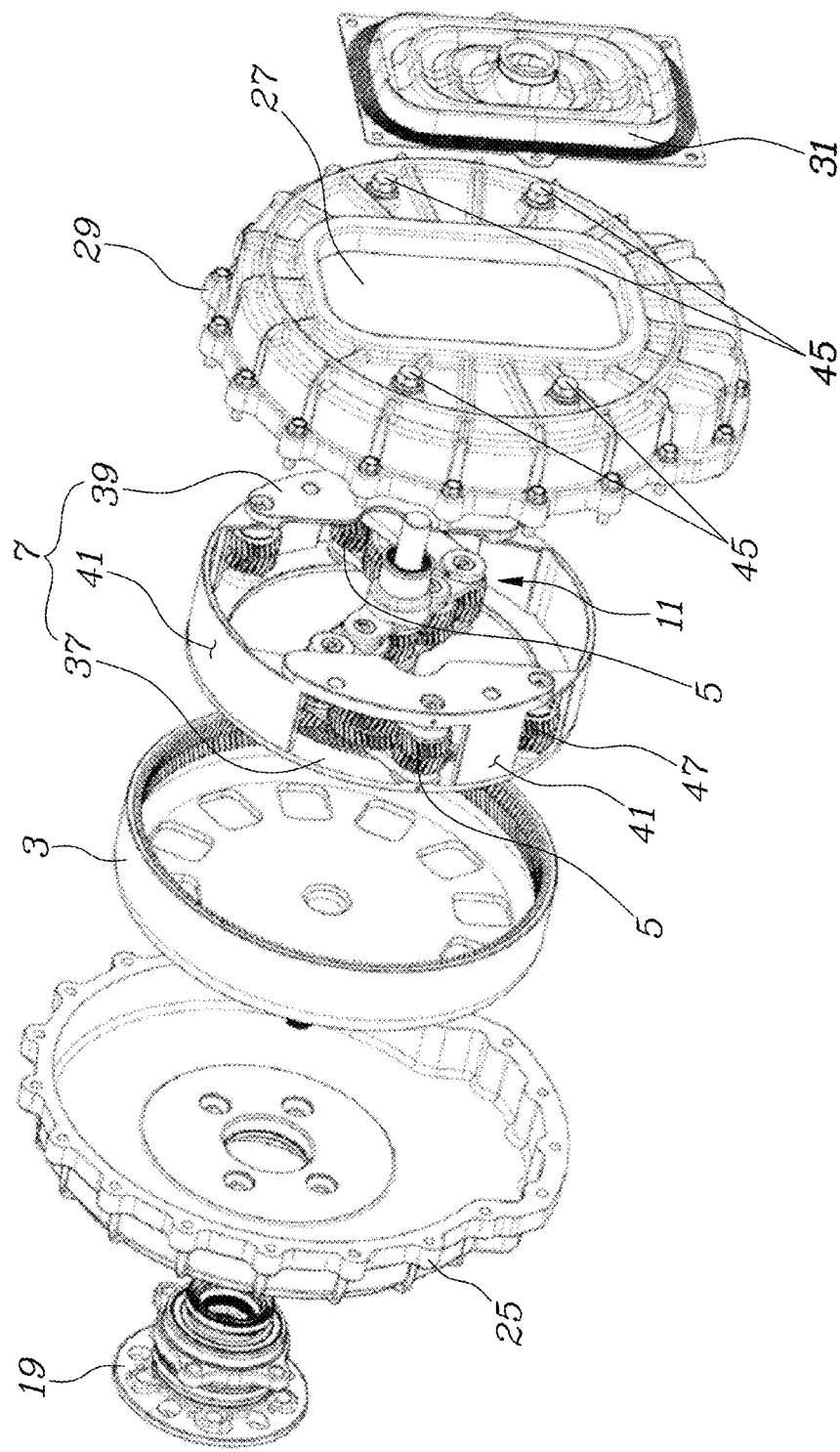
FIG. 2 is an exploded perspective view of the driving device of FIG. 1.
Figure 3:
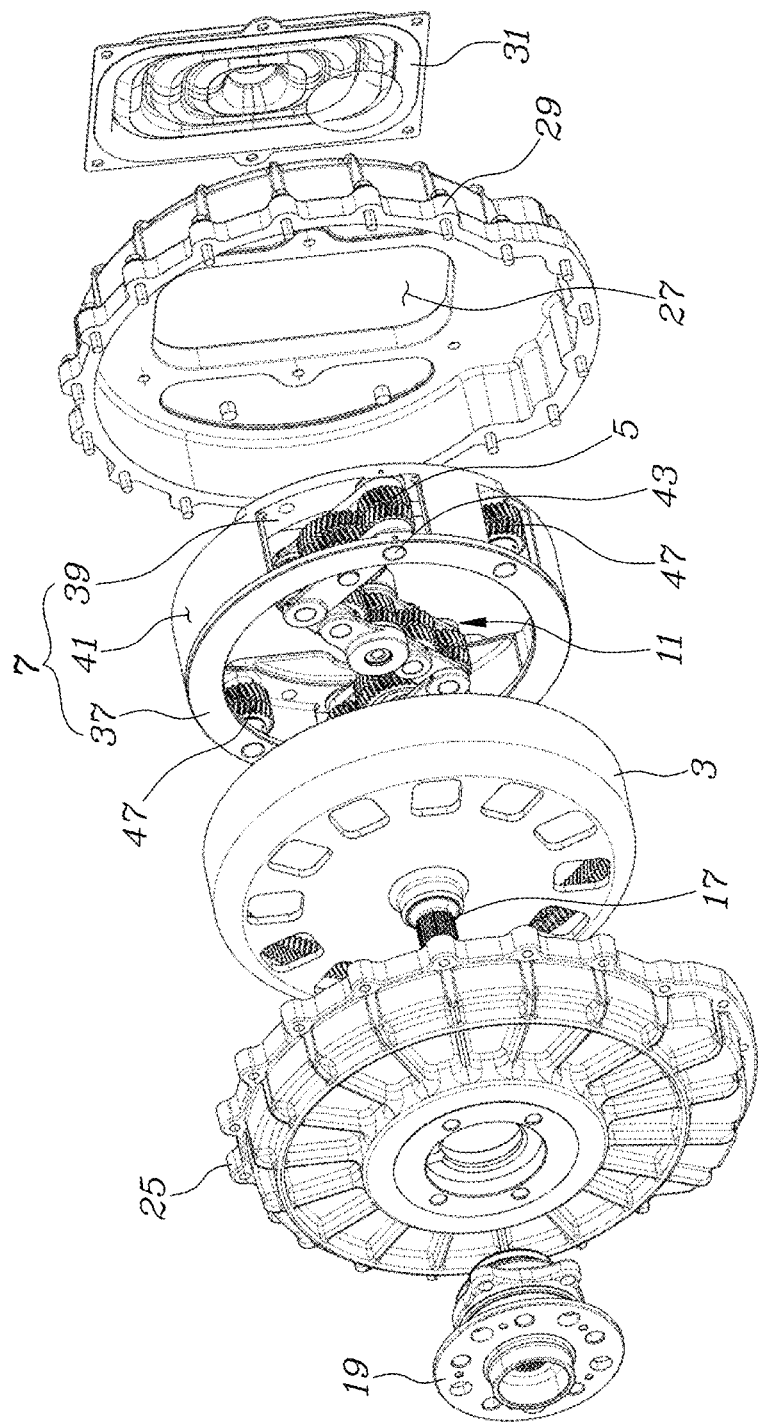
FIG. 3 is another exploded perspective view of the driving device of FIG. 2, taken from the opposite direction of FIG. 2.
Figure 4:
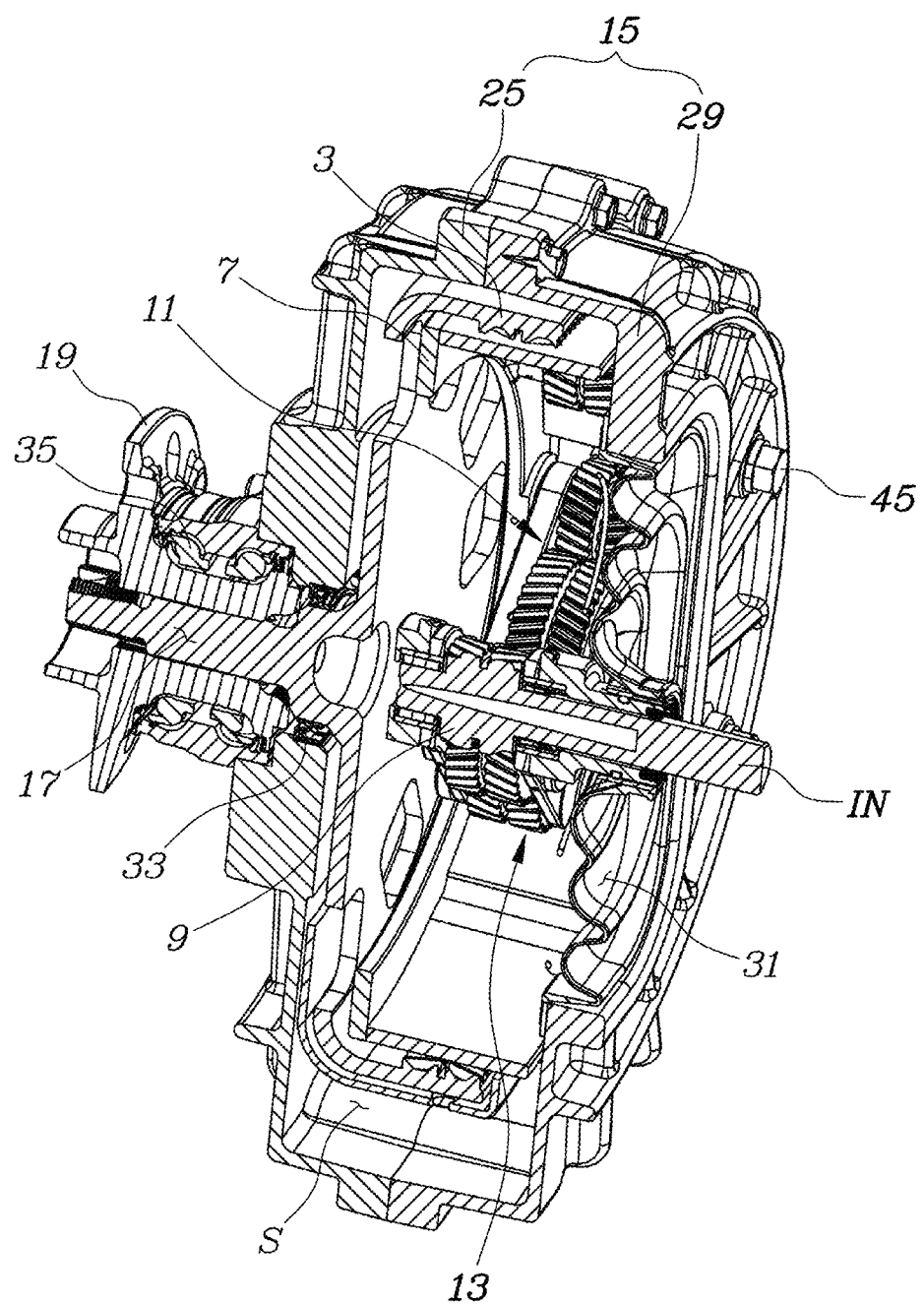
FIG. 4 is a cross-sectional view taken along line IV-IV in FIG. 1.
Figure 5:
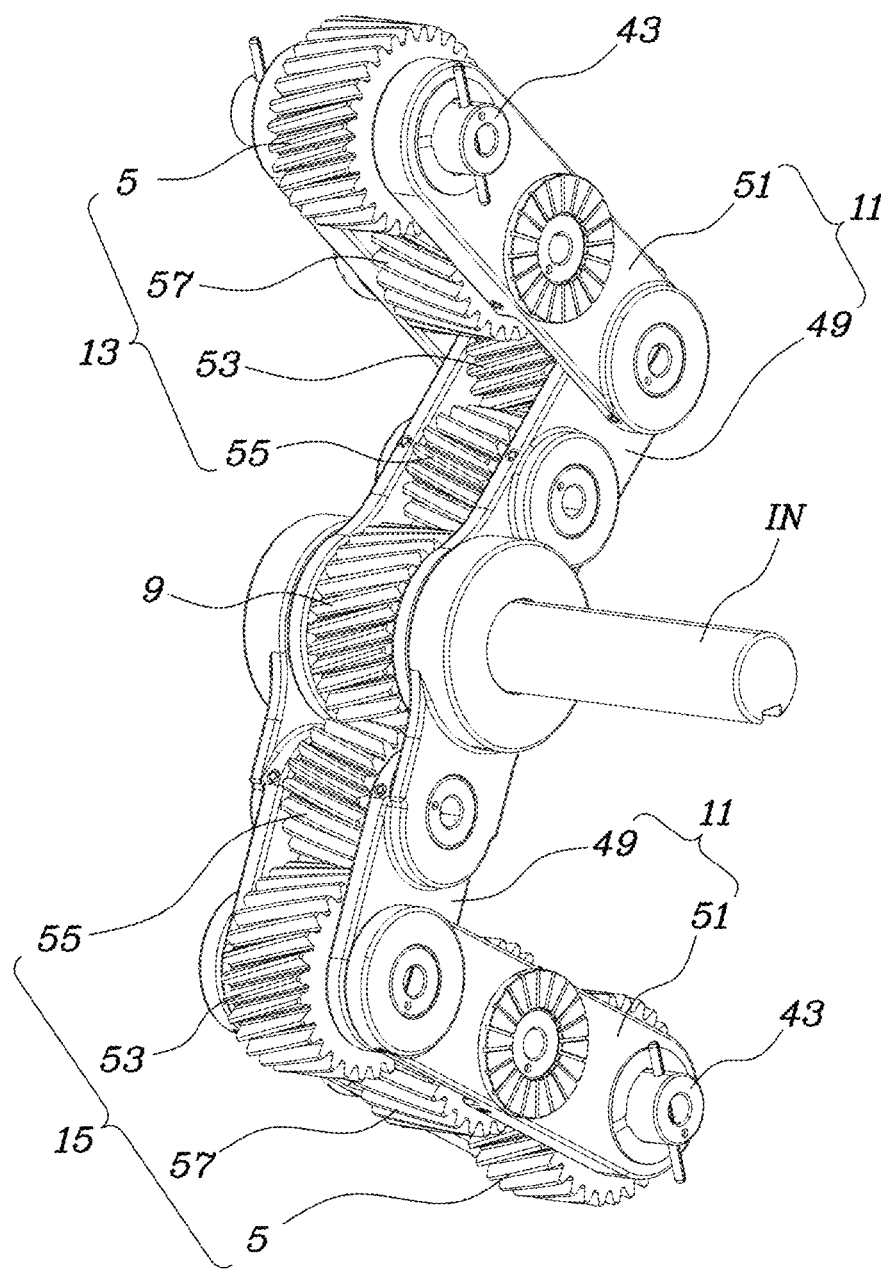
FIG. 5 is a view illustrating the link mechanism of FIG. 2.
Figure 6:
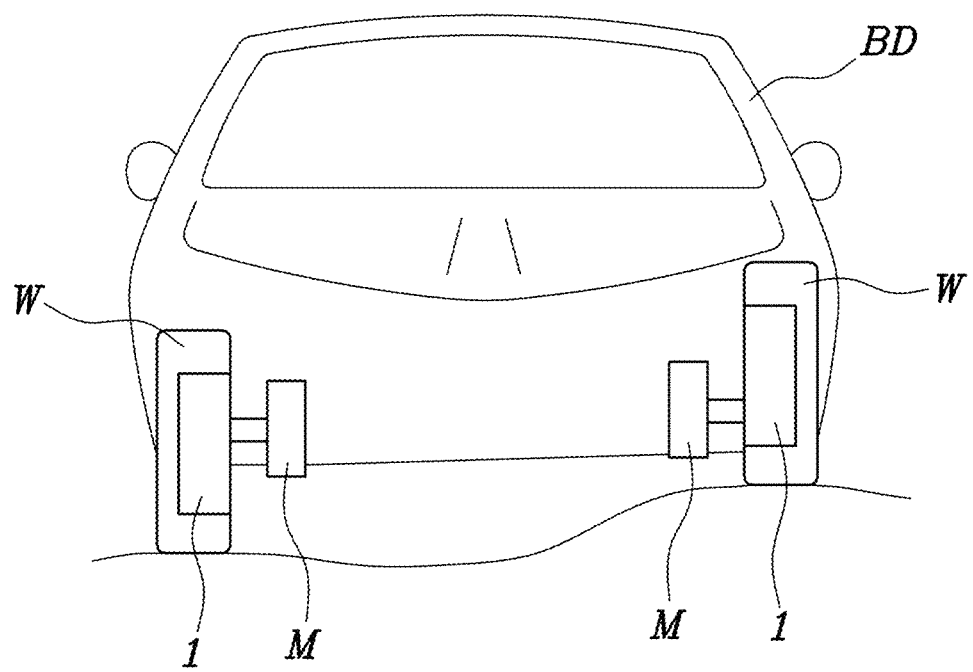
FIG. 6 is a view illustrating the state in which the driving device of the present disclosure is mounted on a vehicle.
Figure 7:
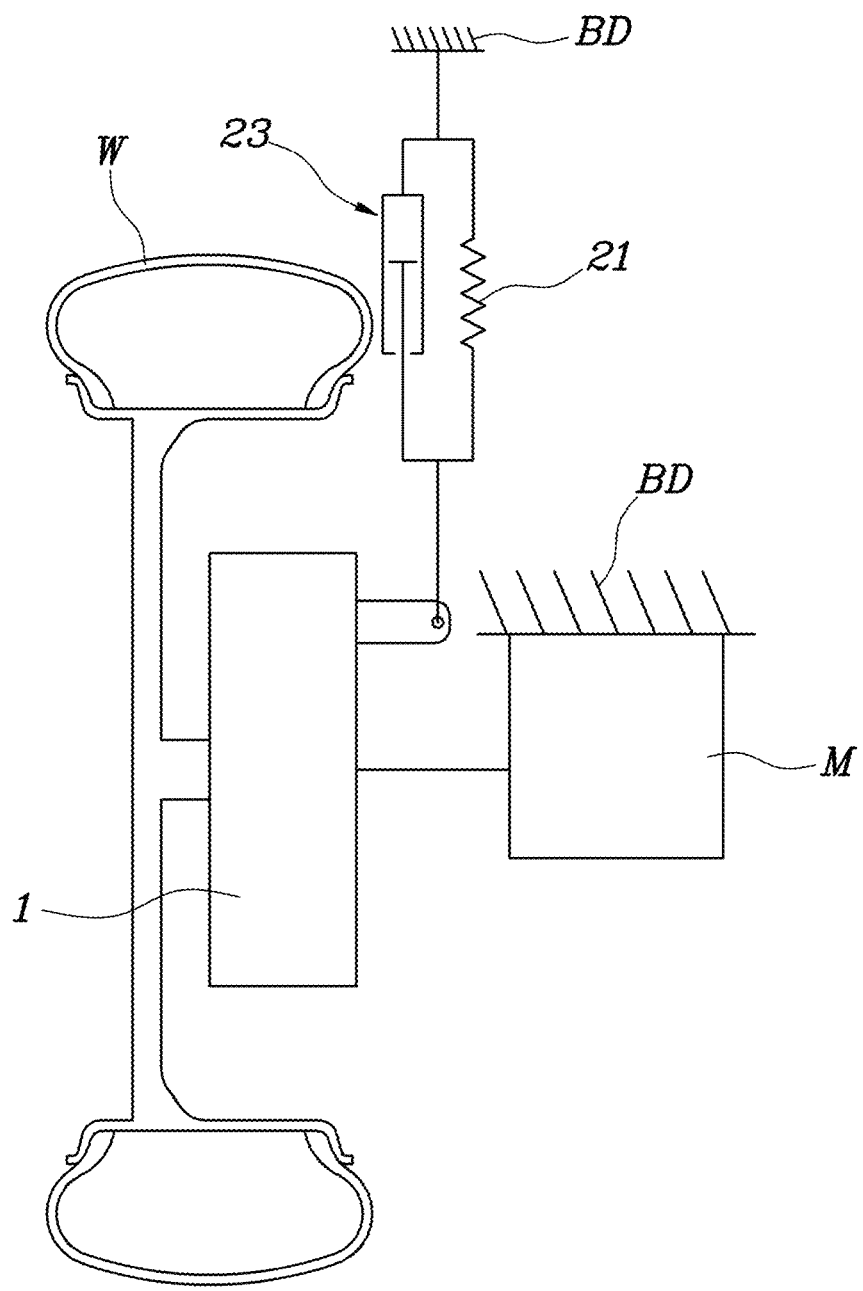
FIG. 7 is a view illustrating a connection structure between the driving device and a vehicle body of FIG. 6.

Meanwhile, the sun gear 9, the ring gear 3, and the gear train 13 may be configured with double helical gears as illustrated in FIGS. 2 to 4.

In this case, in the process of transmitting power from the outside to the ring gear 3 through the sun gear 9, while reducing noise, the durability of the drive device (e.g., system) 1 of the present disclosure can be further enhanced by cancelling out forces that occur along the axial direction of the input shaft IN.

Although the present disclosure has been described and illustrated in conjunction with particular embodiments thereof, it will be apparent to those skilled in the art that various improvements and modifications may be made to the present disclosure without departing from the technical idea of the present disclosure defined by the appended claims.

What is claimed is:

1. A driving device for a vehicle, the driving device comprising:
    a ring gear;
    a final gear meshed with the ring gear;
    a carrier rotatably supporting the final gear;
    a sun gear having a rotation axis parallel to the rotation axis of the ring gear and installed to have a variable inter-axis distance from the rotation axis of the ring gear, the sun gear being configured to receive power from outside;
    a link mechanism interconnecting the sun gear and the final gear such that a connection angle changes depending on a change in the inter-axis distance between the sun gear and the ring gear;
    a gear train provided in the link mechanism to continuously establish a power transmission state between the sun gear and the ring gear regardless of the change in the inter-axis distance between the sun gear and the ring gear; and
    a carrier housing integrally coupled to the carrier and encasing the sun gear, the carrier, the ring gear, and the link mechanism;
    wherein the carrier housing comprises
    an outer housing part coupled to a wheel hub, and
    an inner housing part coupled with the outer housing part to form an accommodation space encasing the sun gear, the carrier, the ring gear, and the link mechanism, and having a housing opening through which an input shaft that transmits external power to the sun gear passes, and
    wherein the housing opening of the inner housing part is provided with a sealing member that closes the housing opening to block the accommodation space from outside while absorbing a change in position of the input shaft.

2. The driving device of claim 1, wherein the ring gear is installed to output power by passing through the carrier housing to an exterior, and
    the input shaft is connected by passing through the carrier housing from the exterior to an interior.

3. The driving device of claim 2, wherein a ring gear boss penetrating the carrier housing is installed at a rotation center of the ring gear, and
    the wheel hub rotatably supported on the carrier housing is coupled to the ring gear boss.

4. The driving device of claim 3, wherein a seal ring is provided between the outer housing part and the ring gear boss, and
    wherein the wheel hub is coupled to the ring gear boss with a spline, and is rotatably supported on the outer housing part via a wheel bearing.

5. The driving device of claim 1, wherein the housing opening of the inner housing part is configured such that a width in an up-and-down direction is longer than a width in a front-to-back direction.

6. The driving device of claim 1, wherein the link mechanism comprises a first link and a second link that are connected to be relatively rotatable,
    wherein a joint gear is installed on a rotation shaft that supports the first link and the second link to be relatively rotatable, and
    wherein the gear train comprises the joint gear, the final gear, a first intermediate gear interconnecting the sun gear and the joint gear, and a second intermediate gear interconnecting the joint gear and the final gear.

7. The driving device of claim 6, wherein the sun gear, the joint gear, and the final gear are all configured to have a same number of teeth.

8. The driving device of claim 7, wherein multiple link mechanisms are arranged around the sun gear, and
    wherein multiple final gears constituting the link mechanisms are arranged on the carrier at regular intervals along a circumferential direction.

9. The driving device of claim 7, wherein the sun gear, the ring gear, and the gear train are configured with double helical gears.

10. A driving device for a vehicle, the driving device comprising:
    a ring gear;
    a final gear meshed with the ring gear;
    a carrier rotatably supporting the final gear;
    a sun gear having a rotation axis parallel to the rotation axis of the ring gear and installed to have a variable inter-axis distance from the rotation axis of the ring gear, the sun gear being configured to receive power from outside;
    a link mechanism interconnecting the sun gear and the final gear such that a connection angle changes depending on a change in the inter-axis distance between the sun gear and the ring gear;
    a gear train provided in the link mechanism to continuously establish a power transmission state between the sun gear and the ring gear regardless of the change in the inter-axis distance between the sun gear and the ring gear; and
    a carrier housing integrally coupled to the carrier and encasing the sun gear, the carrier, the ring gear, and the link mechanism,
    wherein the carrier comprises
    an outer carrier part,
    an inner carrier part disposed in parallel to and spaced internally from the outer carrier part with the final gear and the link mechanism interposed therebetween,
    a bridge part interconnecting the inner carrier part and the outer carrier part, and
    a pinion shaft having opposite ends supported by the outer carrier part and the inner carrier part to rotatably support the final gear and the link mechanism.

11. The driving device of claim 10, wherein the carrier rotatably supports multiple balance gears meshed with the ring gear to support the ring gear.

12. The driving device of claim 11, wherein, along an outer periphery of the outer carrier part and the inner carrier part, multiple bridge parts are provided to be spaced apart from the final gear and the balance gears meshed with the ring gear.

13. The driving device of claim 10, wherein the inner housing part of the carrier housing is fixed to the inner carrier part of the carrier.

* * * * *